United States Patent [19]

Johnson et al.

[11] 4,377,415
[45] Mar. 22, 1983

[54] REINFORCED CEMENT SHEET PRODUCT CONTAINING WOLLASTONITE FOR REDUCED SHRINKAGE

[75] Inventors: Robert M. Johnson; Elmer M. Melling, both of Kenmore, N.Y.

[73] Assignee: National Gypsum Company, Dallas, Tex.

[21] Appl. No.: 233,664

[22] Filed: Feb. 11, 1981

[51] Int. Cl.$^3$ .............................................. C04B 7/02
[52] U.S. Cl. ...................... 106/90; 106/93; 106/99
[58] Field of Search ............ 106/99, 90, 98, 93, 106/97, 120

[56] References Cited

U.S. PATENT DOCUMENTS

| | | | |
|---|---|---|---|
| 4,040,851 | 8/1977 | Zeigler | 106/99 |
| 4,101,335 | 7/1978 | Barrable | 106/99 |
| 4,132,555 | 1/1979 | Barrable | 106/120 |
| 4,199,366 | 4/1980 | Schaefer et al. | 106/99 |

*Primary Examiner*—James Poer
*Attorney, Agent, or Firm*—Joseph P. Gastel

[57] ABSTRACT

A cement-wollastonite product consisting essentially of Portland cement binder in an amount of between about 40% and 90% by weight, and wollastonite in an amount of between about 10% and 60% by weight. The product may contain fibers in an amount of between about 1% and 15% by weight. If the product contains fibers other than asbestos and is to be formed on a Hatschek or other type of wet forming machine, it may contain clay in an amount of between about 2% and 15% by weight, and poly(ethylene oxide) homopolymer in an amount of between about 0.03% and 0.5% by weight. The product may also contain silica and/or filler in an amount of between about 10% and 40% by weight for replacing part of the wollastonite. The filler may be waste fiber-cement product or inert filler material.

21 Claims, No Drawings

REINFORCED CEMENT SHEET PRODUCT CONTAINING WOLLASTONITE FOR REDUCED SHRINKAGE

BACKGROUND OF THE INVENTION

The present invention relates to a cement sheet product which contains asbestos or other reinforcing fibers.

By way of background, in the past asbestos-cement compositions have been formed into sheets for subsequent formation into such products as siding shingles, flat sheets, corrugated sheet products, and the like. These sheets generally contained Type I Portland cement binder in an amount of about 58%, silica and/or filler in an amount of about 27%, and asbestos fibers in an amount of about 15%. The products had many desirable qualities including high strength, exterior durability, easy application, and the ability to be colored in various colors. In addition, products containing asbestos have a dimensional movement as follows when going from a saturated to a bone dry state: Normal cure —0.035—0.045 inches/foot, Autoclaved —0.0-18—0.024 inches/foot. These ranges are well documented in the asbestos-cement products industry. It is also well known that the lower the dimensional movement, the more stable the product, and the more resistant the product is to cracking or warping in extreme cases of outdoor exposure where relative humidity and temperature conditions vary considerably. However, in recent years, governmental regulations have restricted the use of asbestos. Therefore, attempts have been made to find substitutes for asbestos. One such attempt is disclosed in U.S. Pat. No. 4,040,851 which utilizes cotton fibers instead of asbestos fibers, along with other components in addition to Portland cement and silica. However, in the past it has been found that products containing fibrous asbestos substitutes do not have the desirable relatively low wet-to-dry shrinkage characteristics of an asbestos-cement composition, particularly the non-autoclave products, and the higher dimensional movement could result in undesirable exterior durability.

SUMMARY OF THE INVENTION

It is accordingly the object of the present invention to provide a cement product containing asbestos or other fiber substitutes which have low wet-to-dry dimensional changes in both autoclaved and non-autoclaved products. Other objects and attendant advantages of the present invention will readily be perceived hereafter.

The present invention relates to a cement-wollastonite product consisting essentially of Portland cement binder in an amount of between about 40% and 90% by weight, and wollastonite in an amount of between about 10% and 60% by weight. Preferably the product also includes fibers in an amount of between about 1% and 15% by weight. In addition, the product may also contain silica and or filler in an amount of between about 10% and 40% by weight, as a substitute for some of the wollastonite. If the product does not contain asbestos and is to be formed on a Hatschek machine or other type of wet forming machine, it may contain clay in an amount of between about 2% and 15% by weight and poly(ethylene oxide) homopolymer in an amount of between about 0.03% and 0.5% by weight, as set forth in copending application Ser. No. 233,663, filed of even date herewith. The various aspects of the present invention will be more fully understood when the following portions of the specification are read.

DESCRIPTION OF THE PREFERRED EMBODIMENTS

The improved cement product of the present invention is essentially a cementitious product of Portland cement and wollastonite. The product may preferably also contain fibers for improved strength and handleability, but it can be made without fibers. The product can include silica and/or filler as a substitute for some of the wollastonite. The filler may be reground waste fiber-cement product or inert fillers. The product, as noted above, is intended to be used for the same purposes as asbestos-cement products, namely, as siding for houses, roofing, slabs, corrugated sheets, flat sheets and the like. If the product contains fibers other than asbestos and is to be formed on a Hatschek or other wet forming machine, it may also contain clay and poly(ethylene oxide) homopolymer.

It is preferred that Type I Portland cement be used but Type II or any other conventional type may be used. The cement may be present in an amount of between about 40% and 90% by weight and more preferably between about 50% and 70% by weight, although the most preferred range is between about 60% and 70% by weight.

The wollastonite ($CaSiO_3$) is used to reduce the wet-to-dry dimensional changes in both autoclaved and nonautoclaved products including sheets. Wollastonite is especially valuable as a component in the formulation of products which are not autoclavable and which contain fibers other than asbestos because of the inherent higher shrinkage of such products. The wollastonite can be used by itself as a substitute for silica in existing compositions to produce a product which does not require autoclaving, or it may replace part of the silica. The wollastonite may be present in an amount of between about 10% and 60% by weight there it is used by itself. It may also be present in an amount of between about 15% and 30% by weight where silica and/or fillers are present, and more preferably it may be present in an amount of between about 15% and 25% by weight where silica and/or fillers are present. The wollastonite which has been used is known under the trademark WOLLASTONITE NYAD-G and is a product of Interpace Corporation. Wollastonite is a naturally occurring, nonmetallic calcium metasilicate material. It is wholly acicular, with typical aspect ratios of 3:1 to 20:1. The NYAD-G has the highest aspect ratio, typically 15:1 to 20:1, and is the preferred grade although other grades may be used.

As noted above, silica and/or fillers may form a part of the composition. The fillers may be inert substances such as reground product, calcium carbonate, or any other suitable substance. The silica and/or filler which is used is preferably 120 mesh, but it an be any other suitable mesh size between 80 mesh and 325 mesh. The silica and/or filler can be present in an amount of between about 5% and 30% by weight, and more preferably between about 10% and 20% by weight, but the most preferred range is between about 10% and 15% by weight.

Fibers are preferably incorporated into the product to provide increased strength and handleability, although a product can be fabricated without fibers. Fibers which can be used to prepare fiber-cement sheet products in accordance with the present invention are cotton, sisal, hemp, rami, jute, kraft, glass, alumina (KAOWOOL), carbon, mineral fiber, polypropylene, aramid (KEVLAR), and a polyvinyl alcohol fiber (KURALON). It will be appreciated that asbestos fibers may also be used where such use conforms to existing regulations. Each of the foregoing fibers, as well as the other fibers specifically discussed heretofore, can be combined with the remainder of the ingredients. Any of the foregoing fibers may be present in an amount of between about 1% and 15% by weight, and more preferably between about 2% and 10% by weight, and most preferably between about 2% and 7% by weight.

Acetalized polyvinyl alcohol fibers are especially desirable, and such a product known under the trademark KURALON has been used. In this respect, compositions have been made from KURALON VF 5501 and KURALON VPB 103. This product is manufactured by Kuraray Company, Ltd. of Osaka, Japan and is described in its publication entitled "Kuralon Technical Service Manual, Book 1". The KURALON VF 5501 is preferred and by way of example it has the following physical properties: Standard elongation between about 5.5 and 7.1%; standard Youngs modulus between about 195 and 295 g/d; wet shrinkage (100° C.×30 min) between about 0.5 and 3.5%; heat shrinkage (160° C.×30 min) between about 0 and 0.5%; creep (1 g/d 100° C.×60 min) between about 0.5 and 2.0%; specific gravity between about 1.26 and 1.30; and moisture absorbancy (30° C. 65% RH) between about 2 and 5%. The fibers may have a length of between $\frac{1}{8}$" and $\frac{3}{4}$", and a thickness of between 0.5 and 6 denier. All of the other features of the KURALON are set forth in the above-noted publication which is incorporated herein by reference. The acetalized polyvinyl alcohol fiber may be present in the amounts set forth within the above ranges of the fibers.

If the product contains fibers other than asbestos and is to be fabricated on a Hatschek machine or under other conditions where there must be a reasonable drainage rate and a low solids loss, the product can also contain clay and poly(ethylene oxide) homopolymer. The type of clay which has been used successfully as ENGLEHARD X2059. However, other clays may also be used. These clays include bentonite and kaolin types, and BENTONE LT, ATTAGEL 40, MINNGEL PG, and IMVITE IGBA. The clay is used for the purpose of keeping the fibers in suspension during the sheet forming process when fibers are used. The clay may be present in an amount of between about 2% and 15% by weight, and more preferably between about 3% and 10% by weight, and most preferably between about 4% and 7% by weight.

The poly(ethylene oxide) homopolymer which is preferred is known under the trademark POLYOX WSR-301. It is a water soluble resin which is nonionic. It has a molecular weight of approximately 4,000,000 and a viscosity range of 25° C., cps in a 1% solution of 1650-3850 and a Brookfield Spindle No./Speed, rpm of $\frac{1}{4}$. This product is a proprietary product of the Union Carbide Corporation and is described in detail in its various publications including the pamphlet "POLYOX Water-Soluble Resins are Unique" published in November of 1978, which is incorporated herein by reference. The POLYOX WSR-301 is a thickening agent. It also causes very rapid flocculation of the mixture of the clay and the fiber. In addition, other grades of poly(ethylene oxide) can be used in the same range. These grades are POLYOX WSR-1105 having a molecular weight of 900,000 and POLYOX WSR-Coagulant having a molecular weight of 5,000,000. Thus, poly(ethylene oxide) having a molecular weight in a range of between about 900,000 and 5,000,000 can be used. All of the above grades of POLYOX are described in detail in the above publication and they have the common structure $(O-CH_2CH_2)_n$.

The poly(ethylene oxide) can be present in an amount of between about 0.03% and 0.05% by weight, and a more preferred range is between about 0.04% and 0.03% by weight, but the most preferred range is between about 0.05% and 0.1% by weight. In addition, as a refinement, a nonionic flocculant known under the trademark RETEN 420 may be added to improve the flocculation characteristic. The RETEN 420 is a proprietary product of Hercules, Inc. and is a nonionic, high molecular weight, synthetic, water soluble copolymer of acrylamid and betamethacryloxyethyltrimethylammonium methyl sulfate. This product may be present in an amount of between about 0.01% to 0.03% by weight, and more preferably is present in an amount of about 0.01% by weight.

The use of the poly(ethylene oxide), as described above, in combination with the clay, when fibers other than asbestos are used, results in the retention of the cement and fines (of wollastonite, silica and/or fillers). Without the use of the poly(ethylene oxide) in combination with the clay for forming the product on a Hatschek machine or other type of wet forming machine, water will filter rapidly through the mixture so that an undesirably large amount of the wollastonite fines, cement fines, silica and/or filler fines may be lost, which results in a weaker product. When there is rapid drainage on a Hatschek machine, the loss of fines causes the drainage water to be contaminated so that it cannot be recirculated in the sheet-forming process. Thus, while the poly(ethylene oxide) is normally a thickening agent, when it is used in combination with the clay, as noted above, it results in the thorough, very rapid flocculation of the mixture, which in turn results in retention of the fines in suspension. It has been found that the use of clay alone, or poly(ethylene oxide) alone may slow down drainage to a certain extent. However, when they are used together they not only slow down drainage to a proper value, but they also cause rapid flocculation of the slurry so as to result in the retention of the cement fines and silica and/or filler fines in suspension, which in turn results in a stronger and more homogeneous product.

The samples which were tested in accordance with the following examples were made as follows: The fibers which were used were dispersed in 1,000 milliliters of water by use of a Waring blender. This water with the dispersed fibers therein was transferred to a mixing beaker. To this mix any of the other solids which were used, such as cement, wollastonite and filler, were added, and at the same time the clay, if used, was added as a 10% slurry so that the total amount of water was approximately 1,060 milliliters. The total liquid solid mixture was mixed for $1\frac{3}{4}$ minutes and thereafter the poly(ethylene oxide), if used, was added and mixing was continued for approximately 10 seconds. Thereafter, the Reten, if used, was added and the resultant slurry was poured into a suction box and vacuum drawn to remove the excess water. Thereafter, the pat or sample was removed from the suction box and compressed at 325 psi to form a test pat which was approximately 3 inches by 8 inches by $\frac{1}{4}$ inch. It was this test pat or sample which was normal cured or autoclaved to provide the test sample. It will be appreciated that the same procedure, as noted above, was followed when certain of the components were not used, in which event the step referring to the manner in which they were incorporated was eliminated from the above procedure.

The formulations of each of Examples 1-7 are as follows:

| EXAMPLES OF FORMULATIONS IN % BY WEIGHT | | | | | | | |
|---|---|---|---|---|---|---|---|
| | 1 | 2 | 3 | 4 | 5 | 6 | 7 |
| Type I Cement | 59.93 | 57.10 | 69.57 | 68.49 | 56.54 | 49.56 | 43.25 |
| Silica 120 mesh | 13.31 | 12.69 | 0 | 0 | 12.57 | 27.53 | 0 |
| WOLLASTONITE NYAD-G | 26.63 | 25.38 | 25.30 | 24.90 | 25.13 | 16.52 | 49.14 |
| KURALON VF 5501 | 0 | 0 | 2.53 | 0 | 0 | 0 | 0 |
| KURALON VPB 103 | 0 | 0 | 0 | 1.87 | 0 | 0 | 0 |
| COTTON PS 31 | 0 | 0 | 0 | 0 | 2.51 | 2.20 | 2.62 |
| CLAY X 2059 | 0 | 4.76 | 2.53 | 4.67 | 3.14 | 4.13 | 4.91 |
| POLYOX WRS-301 | 0.10 | 0.06 | 0.06 | 0.06 | 0.09 | 0.05 | 0.06 |
| RETEN 420 | 0.03 | 0.01 | 0.01 | 0.01 | 0.01 | 0.005 | 0.006 |

The physical properties of Examples 1-7 are shown in the following table:

| PHYSICAL PROPERTIES OF FORMULATIONS 1-7 | | | | | | | |
|---|---|---|---|---|---|---|---|
| | 1 | 2 | 3 | 4 | 5 | 6 | 7 |
| Type Cure | auto-clave | auto-clave | normal | normal | auto-clave | auto-clave | auto-clave |
| Shrinkage Wet to Dry - in./ft. | 0.011 | 0.012 | 0.024 | 0.023 | 0.013 | 0.012 | 0.005 |
| % Absorption | 23.7 | 26.0 | 25.7 | 24.4 | 29.8 | 28.0 | 36.7 |
| Density - lb/ft$^3$ | 98.7 | 96.0 | 94.4 | 97.0 | 89.7 | 106.3 | 81.3 |
| Deflection - in. | 0.048 | 0.052 | 0.106 | 0.061 | 0.040 | 0.049 | 0.058 |
| Modulus of Rupture psi | 3309 | 3358 | 4128 | 3194 | 2643 | 3071 | 1790 |

In the above examples those which were designated as normal cure, were cured in moist air at ambient temperature for twenty-eight days. Those which were designated as having been autoclaved, were cured at room temperature, in a moist atmosphere for two days. The samples were then placed in an autoclave and subjected to a saturated steam atmosphere at a pressure of 110 psi for a period of ten hours. The pressure was then relieved and the samples were removed.

In interpreting the data of the above tests, it should be noted that the normal wet-to-dry shrinkage for asbestos-cement sheet products is about 0.040 inches per foot for normal cure material and about 0.020 inches per foot autoclaved material. Example 1, which contains both silica and wollastonite, demonstrates the reduced shrinkage due to the use of wollastonite. In this respect, the shrinkage was only 0.011 inches per foot.

Example 2 exhibits a wet-to-dry shrinkage of 0.012 inches per foot. It is to be noted, however, that Example 2 contains clay in the amount of 4.76% by weight which is used to enhance fiber dispersion. However, there were no fibers used in Example 2 which could affect the strength, and therefore Example 2 shows that the existence of clay does not appreciably change the physical properties which are otherwise obtained. In Examples 3 and 4 there was no silica used, only wollastonite NYAD-G. However, KURALON, an acetalized polyvinyl alcohol product was used as a reinforcing fiber. In these non-autoclaved examples, the wet-to-dry shrinkage was about 0.024 inches per foot, which is in the range of autoclaved asbestos-cement products, and which is less than the normally expected shrinkage of about 0.040 inches per foot which is obtained in the absence of wollastonite. However, the modulus of rupture with the use of KURALON VF 5501 increased to about 4100 psi, and the deflection also increased over the examples which did not use fibers. Examples 3 and 4 are significant in that they show that the wet-to-dry shrinkage for a normal cured product is well below 0.040 inches per foot, which is acceptable for cement sheet products.

Examples 5 and 6 show that with the use of cotton as a reinforcing fiber and with the use of both wollastonite and silica, an autoclaved product gives highly desirable wet-to-dry shrinkage and in addition provides adequate strength. Example 7 is an extreme case wherein the silica and a portion of the cement were replaced with wollastonite, cotton was used as the reinforcing fiber, and the product was autoclaved. This example shows that the excess wollastonite resulted in very low shrinkage, but the strength was reduced because of the low cement content and the low density.

The effect on wet-to-dry shrinkage of substituting wollastonite for silica in various cement compositions is shown by the following examples which were autoclaved, as defined above, and tested by standard procedure for wet-to-dry shrinkage and for density.

| EXAMPLES OF AUTOCLAVED FORMULATIONS IN % BY WEIGHT | | | | | | |
|---|---|---|---|---|---|---|
| | 8 | 9 | 10 | 11 | 12 | 13 |
| Type I Cement | 54.7 | 57.7 | 60 | 60 | 60 | 60 |
| Silica 120 mesh | 30.3 | 0 | 40 | 0 | 35 | 0 |
| WOLLASTONITE NYAD-G | 0 | 30.3 | 0 | 40 | 0 | 35 |
| ASBESTOS 5R | 7.5 | 7.5 | 0 | 0 | 0 | 0 |
| ASBESTOS 6D | 7.5 | 7.5 | 0 | 0 | 0 | 0 |
| COTTON PS 31 | 0 | 0 | 0 | 0 | 5 | 5 |
| Shrinkage Wet to Dry - in./ft. | .0190 | .0063 | .0126 | .0052 | .0144 | .0063 |

It is known to one skilled in the art that autoclaved asbestos-cement products generally have a wet-to-dry shrinkage of 0.018 ft./in. to 0.024 in./ft. From the above data it can be seen that the wollastonite reduced the wet-to-dry shrinkage by a factor of approximately 3.0.

The effect on wet-to-dry shrinkage of substituting wollastonite in various cement compositions is shown by the following examples which were normal cured, as defined above, and tested by standard procedures.

| EXAMPLES OF NORMAL CURED FORMULATIONS IN % BY WEIGHT | | | | | |
|---|---|---|---|---|---|
| | 14 | 15 | 16 | 17 | 18 |
| Type I Cement | 54.7 | 60 | 60 | 60 | 60 |
| Silica 120 mesh | 0 | 40 | 0 | 35 | 0 |
| WOLLASTONITE NYAD-G | 30.3 | 0 | 40 | 0 | 35 |
| ASBESTOS 5R | 7.5 | 0 | 0 | 0 | 0 |
| ASBESTOS 6D | 7.5 | 0 | 0 | 0 | 0 |
| COTTON PS 31 | 0 | 0 | 0 | 5 | 5 |
| Shrinkage Wet to Dry - in./ft. | | .0185 | .0329 | .0123 .0470 | .0160 |

It is known to one skilled in the art that normal-cured asbestos-cement products generally have a wet-to-dry shrinkage of 0.035 in./ft. to 0.045 in./ft. From the above data it can be seen that wollastonite reduced the wet-to-dry shrinkage by a factor of between 2 and 3.

It can thus be seen that the improved cement product of the present invention is manifestly capable of achieving the above enumerated objects, and while preferred embodiments of the present invention have been disclosed, it will be understood that the present invention is not limited thereto, but may be otherwise embodied within the scope of the following claims.

What is claimed is:

1. A cement-wollastonite product comprising Portland cement binder in an amount of between about 40% and 90% by weight an wollastonite in an amount of between about 10% and 60% by weight to provide low wet-to-dry dimensional changes.

2. A cement-wollastonite product as set forth in claim 1 including silica in an amount of between about 5% and 30% by weight.

3. A cement-wollastonite product as set forth in claim 1 including fibers in an amount of between about 1% and 15%.

4. A cement-wollastonite product as set forth in claim 3 including silica in an amount of between about 5% and 30% by weight.

5. A cement-wollastonite product as set forth in claim 3 wherein said fibers are acetalized polyvinyl alcohol.

6. A cement-wollastonite product as set forth in claim 3 wherein said fibers are selected from the group of asbestos, cotton, sisal, hemp, rami, jute, kraft, glass, alumina, carbon, mineral fiber, polypropylene and aramid fibers.

7. A cement-wollastonite product as set forth in claim 6 including silica in an amount of between about 5% and 30% by weight.

8. A cement-wollastonite product as set forth in claim 1 wherein said Portland cement is present in an amount of between about 50% and 70% and wherein said wollastonite is present in an amount of between about 15% and 30%.

9. A cement-wollastonite product as set forth in claim 8 including silica in an amount of between about 5% and 30% by weight.

10. A cement-wollastonite product as set forth in claim 8 including fibers in an amount of between about 3% and 10%.

11. A cement-wollastonite product as set forth in claim 10 including silica in an amount of between about 5% and 30% by weight.

12. A cement-wollastonite product as set forth in claim 10 wherein said fibers are acetalized polyvinyl alcohol fibers.

13. A cement-wollastonite product as set forth in claim 9 including fibers in an amount of between about 4% and 7%.

14. A cement-wollastonite product as set forth in claim 13 wherein said fibers are acetalized polyvinyl alcohol fibers.

15. A cement-wollastonite product as set forth in claim 1 wherein said low wet-to-dry dimensional changes for autoclaved products range between about 0.005 and 0.012 inches per foot.

16. A cement-wollastonite product as set forth in claim 1 wherein said low wet-to-dry dimensional changes for normal cured products range between about 0.0123 and 0.024 inches per foot.

17. A cement-wollastonite product as set forth in claim 1 wherein the wet-to-dry dimensional changes of an autoclaved product are reduced by a factor of up to about 3 as compared to the wet-to-dry dimensional changes of similar autoclaved products containing silica and no wollastonite.

18. A cement-wollastonite product as set forth in claim 1 wherein the wet-to-dry dimensional changes of a normal cured product are reduced by a factor of up to about 3 compared to similar normal cured products containing no wollastonite.

19. A cement-wollastonite product as set forth in claim 1 wherein said low wet-to-dry dimensional changes of a product are reduced by a factor of at least about 2 as compared to similar products containing silica and no wollastonite which are either autoclaved or normal curved.

20. A cement-wollastonite product as set forth in claim 1 wherein said low wet-to-dry dimensional changes for autoclaved products are less than about 0.013 inches per foot.

21. A cement-wollastonite product as set forth in claim 1 wherein said low wet-to-dry dimensional changes for normal cured products are less than about 0.024 inches per foot.

* * * * *

UNITED STATES PATENT AND TRADEMARK OFFICE
CERTIFICATE OF CORRECTION

PATENT NO. : 4,377,415
DATED : March 22, 1983
INVENTOR(S) : Robert M. Johnson and Elmer M. Melling It is certified that error appears in the above-identified patent and that said Letters Patent are hereby corrected as shown below:

Column 2, line 39, change "there" to --where--.
Column 3, line 45, change "MINNGEL PG" to --MINNGEL FG--;
          line 57, after "range" change "of" to --at--.
Column 4, line 9, change "0.05%" to --0.5%--;
          line 11, change "0.03%" to --0.3%--.
Column 7, line 30 (claim 1), after "weight" change "an" to
                 --and--.
Column 8, line 38 (claim 18), after "3" insert --as--.

Signed and Sealed this

Twenty-fourth Day of May 1983

[SEAL]

Attest:

DONALD J. QUIGG

Attesting Officer

Acting Commissioner of Patents and Trademarks